(12) United States Patent
Hansen et al.

(10) Patent No.: US 8,807,257 B1
(45) Date of Patent: Aug. 19, 2014

(54) METHOD FOR FORMING A VACUUM ADHESION

(75) Inventors: Jeffrey Hansen, Renton, WA (US); Karl Edward Nelson, Shoreline, WA (US); Gary Georgeson, Tacoma, WA (US); Charles M. Richards, Kent, WA (US); Scott Lea, Renton, WA (US); Daniel J. Wright, Mercer Island, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/615,862

(22) Filed: Sep. 14, 2012

(51) Int. Cl.
*B60B 39/00* (2006.01)
*B62D 57/00* (2006.01)
*B62D 57/04* (2006.01)

(52) U.S. Cl.
CPC ............... *B62D 57/00* (2013.01); *B62D 57/04* (2013.01)
USPC ............................. 180/164; 180/8.1; 180/8.5

(58) Field of Classification Search
CPC ............................... B62D 57/00; B62D 57/04
USPC ............ 180/164; 294/183; 51/180, 429, 174, 51/170, 273; 114/222; 15/52, 98, 49
See application file for complete search history.

(56) References Cited

U.S. PATENT DOCUMENTS 5,592,998 A * 1/1997 Urakami .................. 180/164

OTHER PUBLICATIONS

Troy et al., "Holonomic Motion Vehicle for Travel on Non-Level Surfaces," U.S. Appl. No. 13/210,899, filed Aug. 6, 2011, 38 Pages.
Bossi et al., "Ultrasound Inspection System for Inspecting a Test Object with Non-Planar Feature." U.S. Appl. No. 13/596,977, filed Aug. 28, 2012, 107 Pages.
Troy et al., "Beam Directed Motion Control System," U.S. Appl. No. 13/206,269, filed Aug. 9, 2011, 76 Pages.
Troy et al., "Autonomous Non-Destructive Evaluation System for Aircraft Structures," U.S. Appl. No. 13/160,238, filed Jun. 14, 2011, 70 Pages.

* cited by examiner

*Primary Examiner* — Joseph M Rocca
*Assistant Examiner* — Jacob Knutson
(74) *Attorney, Agent, or Firm* — Yee & Associates, P.C.

(57) ABSTRACT

A method, apparatus, and system for adhering a vacuum to a surface is provided. A seal is positioned relative to a surface. The seal is associated with a structure and is in communication with a channel within the structure. The seal is rotated relative to the structure such that the seal at least partially conforms to the surface. Air is drawn into the channel within the structure through the seal such that the seal adheres to the surface.

10 Claims, 17 Drawing Sheets

METHOD FOR FORMING A VACUUM ADHESION

BACKGROUND INFORMATION

1. Field

The present disclosure relates generally to adhesion to surfaces and, in particular, to vacuum adhesion to surfaces. Still more particularly, the present disclosure relates to a method and apparatus for forming a vacuum adhesion between a number of seals and a surface while optionally allowing relatively free motion along the surface.

2. Background

Different types of attachment systems may be used to attach a platform to a surface. The platform may be, for example, a stage, a robotic machine, a robotic crawler, a vehicle, a mobile structure, or some other type of platform. Some platforms, such as, for example, but not limited to, robotic machines, may use vacuum systems to attach to a surface.

For example, a robotic machine may have one or more legs and a vacuum system associated with these legs. Further, one or more seals may be attached to the legs. The vacuum system may create at least a partial vacuum between the seals and a surface to form a vacuum adhesion with the surface. This vacuum adhesion may allow the robotic machine to move along a surface, while remaining attached to the surface. In particular, the robotic machine may move along a vertical surface, a horizontal or tilted surface, or some other angled surface without falling off the surface when the vacuum adhesion is formed between the seals on the robotic machine and the surface.

With these types of vacuum systems, a cushion of air is formed between the seals and the surface during operation of the vacuum system. In other words, a gap is present between the seals and the surface. The gap between the seals and the surface allows the seals to float above the surface while the downward force provided by the vacuum system allows wheels on the robotic vehicle to remain in contact with the surface. In this manner, the robotic machine may obtain traction on the wheels, which may be attached to motors that propel the robotic machine in a given direction. Consequently, the robotic machine may adhere to the surface and move along the surface with a reduced amount of friction between the robotic machine and the surface.

The width of the gap between the seals and the surface may determine the strength of the vacuum adhesion formed between the robotic machine and the surface. When the gap is wider than some selected threshold, the vacuum adhesion may not have the desired level of strength. Consequently, the robotic machine may lose traction and be unable to climb a vertical surface or may fall off the surface. When the gap is narrower than some selected threshold, the vacuum adhesion may be stronger than desired. Consequently, the robotic machine may be stuck to the surface and unable to move along the surface.

With some currently available vacuum systems, the width of the gap formed between the seals of the robotic machine and the surface may change as the robotic machine moves along the surface when the surface is not flat and/or has inconsistencies. For example, the surface may be a curved surface, such as the outer surface of a fuselage of an aircraft. In some cases, the surface may have inconsistencies such as, for example, without limitation, protrusions, protruding fastener joints, and/or other types of inconsistencies that may affect the width of the gap as the robotic machine moves over the surface.

A curved shape, curved features, surface inconsistencies, and/or other feature that make a surface not flat may cause the strength of the vacuum adhesion formed between the robotic machine and the surface to fluctuate as the robotic machine moves over the surface. Therefore, it would be desirable to have a method and apparatus that takes into account at least some of the issues discussed above, as well as other possible issues.

SUMMARY

In one illustrative embodiment, an apparatus comprises a structure and a seal. The seal is associated with the structure and is in communication with a channel within the structure. The seal is configured to adhere to a surface relative to which the seal is positioned when air is drawn into the channel of the structure through the seal. The seal is configured to rotate relative to the structure to at least partially conform to a shape of the surface.

In another illustrative embodiment, an adhesion system comprises a structure, a number of sleeves, a number of seals, and a vacuum system. The structure comprises a number of structural members. A sleeve in the number of sleeves is positioned in a channel within a corresponding structural member in the number of structural members. The sleeve is configured to move in a direction along a center axis through the sleeve and the channel within the structural member. A seal in the number of seals is associated with a bearing surface at an end of the sleeve. The seal is configured to rotate relative to the sleeve independently of movement of the sleeve in the direction along the center axis through the sleeve and the channel within the structural member. The vacuum system is configured to draw air into the channel within the structure through a seal channel in the seal and a sleeve channel in the sleeve such that a vacuum adhesion is formed between the seal and a surface over which the seal is positioned.

In yet another illustrative embodiment, a method for adhering to a surface that is non-planar is provided. A seal is positioned relative to the surface. The seal is associated with a structure and is in communication with a channel within the structure. The seal is rotated relative to the structure such that the seal at least partially conforms to the surface. Air is drawn into the channel within the structure through the seal such that the seal adheres to the surface.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account different considerations. For example, the different illustrative embodiments recognize and take into account that it may be desirable to have an adhesion system that allows a platform to adhere to a surface that is not flat and/or has inconsistencies using a vacuum adhesion with a desired level of strength. In particular, the different illustrative embodiments recognize and take into account that it may be desirable to have an adhesion system that allows a vacuum adhesion with a desired level of strength to be formed between an object and a surface, while minimizing static friction between the object and the surface.

Thus, the illustrative embodiments provide a method and apparatus for forming a vacuum adhesion between a number of seals and a surface. In particular, the illustrative embodiments provide a method and apparatus for maintaining a vacuum adhesion between a platform and a surface that is not flat and/or has inconsistencies, while the platform moves along the surface.

Figure 1:
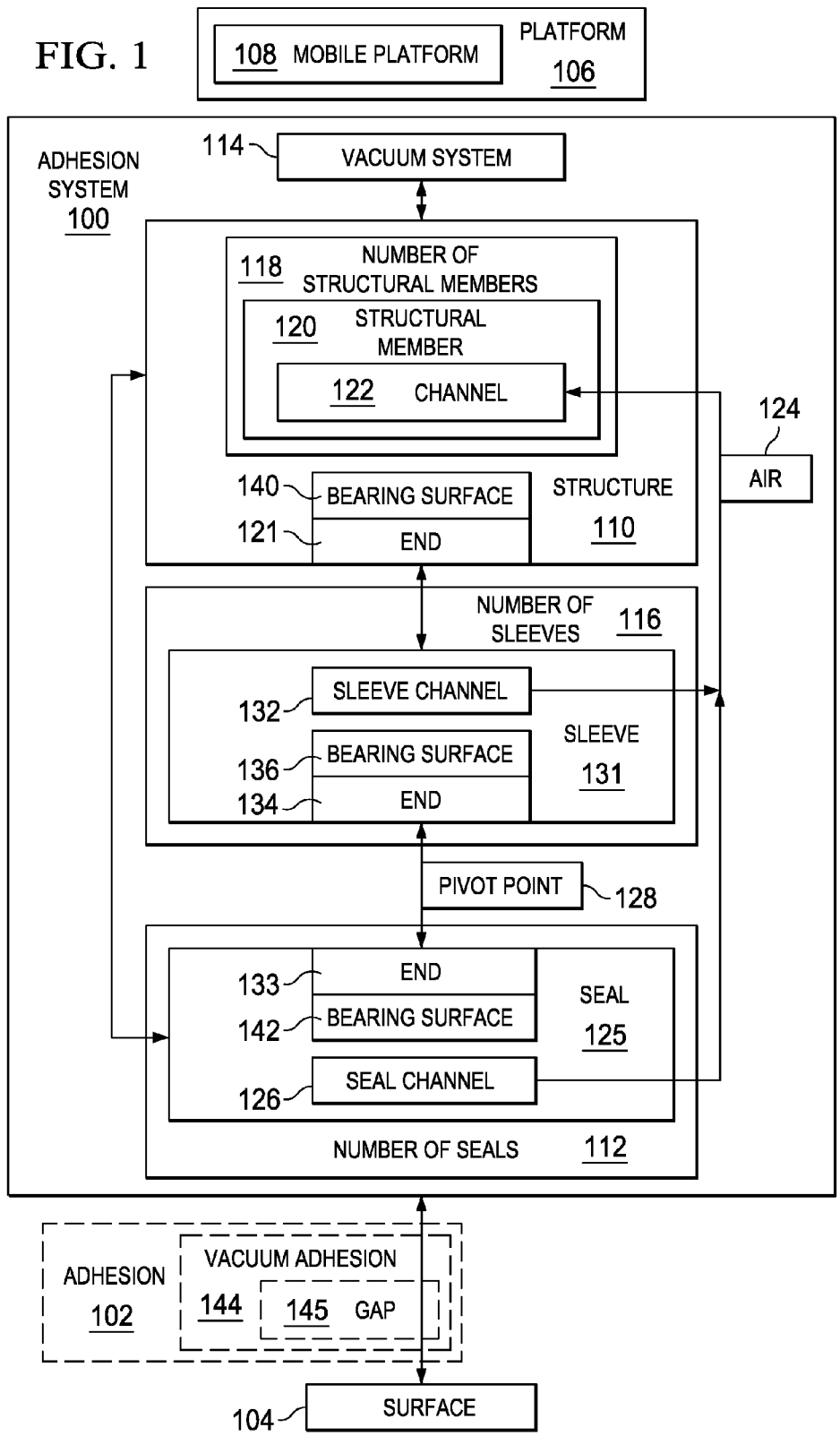
FIG. 1 is an illustration of an adhesion system in the form of a block diagram in accordance with an illustrative embodiment.

Referring now to the figures, and in particular, with reference to FIG. 1, an illustration of an adhesion system in the form of a block diagram is depicted in accordance with an illustrative embodiment. In these illustrative examples, adhesion system 100 is configured to create adhesion 102 between surface 104 and platform 106. Surface 104 is a surface that is non-planar. More specifically, one or more portions of surface 104 may be non-planar in these examples. In other words, the entire surface 104 may not be flat.

For example, without limitation, surface 104 may have a curved shape. In some cases, different portions of surface 104 may have different curved features that form, for example, without limitation, one or more hills and valleys along surface 104. In other cases, surface 104 may have inconsistencies along surface 104. For example, surface 104 may have protrusions at different locations on surface 104. As another example, fastener joints may extend out of a plane through surface 104.

Surface 104 may belong to any of a number of different types of objects. Surface 104 may belong to, for example, but not limited to, a fuselage of an aircraft, a wing of an aircraft, a nacelle of an engine for an aerospace vehicle, a hull of a ship, a missile, a cargo container, a door, a wall, a roof, a window, a structure, a table, a floor, or some other type of object.

Platform 106 may take the form of a stationary platform or a mobile platform. Examples of stationary platforms include, but are not limited to, a stage, an inspection system, a man-made structure, a container, and a retaining structure. Examples of mobile platforms include, but are not limited to, a mobile robotic machine, a robotic crawler, a mobile inspection system, an unmanned ground vehicle, or some other type of mobile platform. In these illustrative examples, platform 106 takes the form of mobile platform 108.

Adhesion system 100 may be associated with platform 106. When one component is "associated" with another component, the association is a physical association in the depicted examples. For example, a first component, such as adhesion system 100, may be considered to be associated with a second component, such as platform 106, by being secured to the second component, bonded to the second component, mounted to the second component, welded to the second component, fastened to the second component, and/or connected to the second component in some other suitable manner.

The first component also may be connected to the second component using a third component. The first component also may be considered to be associated with the second component by being formed as part of and/or an extension of the second component. In this manner, adhesion system 100 may be considered part of platform 106 in some illustrative examples.

As depicted, adhesion system 100 comprises structure 110, number of seals 112, and vacuum system 114. In some cases, adhesion system 100 may also include number of sleeves 116. As used herein, a "number of" items means one or more items. In this manner, number of seals 112 and number of sleeves 116 may be one or more seals and one or more sleeves, respectively.

In these illustrative examples, structure 110 is a support structure. Structure 110 may be associated with platform 106 and configured to support platform 106 over surface 104. Structure 110 may comprise number of structural members 118.

Number of structural members 118 may be considered, for example, the legs of structure 110. In particular, number of structural members 118 may be considered the legs of platform 106. In some illustrative examples, number of structural members 118 may be portions of the same structure. In other illustrative examples, number of structural members 118 may be individual members connected together to form structure 110.

Number of seals 112 may be associated with number of structural members 118. In these illustrative examples, each seal in number of seals 112 may be associated with a corresponding structural member in number of structural members 118. For example, each seal in number of seals 112 may be attached to an end of a corresponding structural member in number of structural members 118.

Structural member 120 is an example of one of number of structural members 118. Structural member 120 has channel 122 through which air 124 is allowed to flow. Seal 125 is associated with end 121 of structural member 120. Seal 125 has seal channel 126 through which air 124 is allowed to flow. Air 124 is allowed to flow between channel 122 of structural member 118 and seal channel 126. In this manner, seal 125 is in communication with channel 122 of structural member 118. More specifically, seal channel 126 is in communication with channel 122 of structural member 118.

In these illustrative examples, seal 125 is associated with end 121 of structural member 120 such that channel 122 of structural member 120 and seal channel 126 share a common center axis. Further, in these examples, seal 125 is associated with end 121 of structural member 120 in a manner that allows seal 125 to rotate about pivot point 128. Pivot point 128 is a pivot point located along the center axis through structural member 120.

As one illustrative example, seal 125 may be attached to structural member 120 by sleeve 131 in number of sleeves 116. Sleeve 131 may be associated with structural member 120 at end 121 of structural member 120. Sleeve 131 may have sleeve channel 132 through which air 124 is allowed to flow. In this illustrative example, sleeve 131 is associated with structural member 120 such that channel 122 of structural member 120 and sleeve channel 132 share a common center axis. In this manner, sleeve channel 132 and seal channel 126 also share a common center axis.

Sleeve 131 is movably attached to structural member 120 in this illustrative example. In particular, sleeve 131 may be movably attached to structural member 120 such that sleeve 131 may move relative to structural member 120 in a direction along the center axis shared by structural member 120, sleeve 131, and seal 125. The movement of sleeve 131 is independent of the rotation of seal 125 about pivot point 128.

For example, sleeve 131 may be configured to slide within channel 122 of structural member 120 along the center axis through structural member 120. This sliding movement may be restricted to within a selected range of movement. However, sleeve 131 may "float" freely within channel 122 of structural member 120 within this selected range of movement.

Further, end 133 of seal 125 is movably attached to end 134 of sleeve 131 in this illustrative example. Sleeve 131 has bearing surface 136 at end 134 of sleeve 131. Bearing surface 136 has a shape selected to allow end 133 of seal 125 attached to bearing surface 136 of sleeve 131 at end 134 of sleeve 131 to rotate about pivot point 128. This rotation may be in any direction relative to pivot point 128. However, the amount of rotation may be limited by the size and/or shape of bearing surface 136.

Additionally, as stated above, the rotation of seal 125 about pivot point 128 is independent of the movement of sleeve 131 in the direction along the center axis shared by structural member 120, sleeve 131, and seal 125.

In some illustrative examples, sleeve 131 may not be used. Instead, seal 125 may be directly attached to end 121 of structural member 120. For example, seal 125 may have bearing surface 142 at end 133 of seal 125. Bearing surface 142 may have a shape selected to allow seal 125 to rotate about pivot point 128 in any direction when seal 125 is attached to end 121 of structural member 120. As another example, structural member 120 may have bearing surface 140 at end 121 of structural member 120. Bearing surface 140 may have a size and shape configured to allow seal 125 to rotate about pivot point 128 in any direction.

In these illustrative examples, structure 110 is associated with vacuum system 114. Vacuum system 114 may be configured to draw air 124 into channel 122 of structural member 120 from seal channel 126. When sleeve 131 is used, air 124 is drawn into sleeve channel 132 from seal channel 126 and then into channel 122 of structural member 120 from sleeve channel 132.

During operation of vacuum system 114, air 124 in the environment around adhesion system 100 and platform 106 may be drawn into channel 122 of structural member 120 through seal channel 126 of seal 125. In particular, vacuum system 114 draws air 124 into channel 122 of structural member 120 to form adhesion 102 between seal 125 and surface 104.

Adhesion 102 takes the form of vacuum adhesion 144 in these illustrative examples. As used herein, vacuum adhesion 144 is formed when at least a partial vacuum is created between seal 125 and surface 104. The flow of air 124 from the environment around adhesion system 100 and platform 106 into seal channel 126, sleeve channel 132, and channel 122 of structural member 120 forms gap 145 between seal 125 and surface 104 in addition to forming vacuum adhesion 144. In some cases gap 145 may also be referred to as an "air micro-cushion", "air gap", or "air cushion".

In these examples, the width of gap 145 is the distance between seal 125 and surface 104. The width of gap 145 may vary along gap 145 depending on the shape of surface 104 and depending on whether seal 125 has rotated about pivot point 128.

Gap 145 may function as an air bearing that holds seal 125 close to surface 104, while reducing static friction to within selected tolerances. In other words, gap 145 allows seal 125 to "float" above surface 104 while maintaining vacuum adhesion 144 between seal 125 and surface 104. Further, gap 145 allows seal 125 to be moved over surface 104 with a reduced amount of static friction and without causing undesired effects to surface 104.

In these illustrative examples, all seals in number of seals 112 may be implemented in a manner similar to seal 125. Further, all sleeves in number of sleeves 116 may be implemented in a manner similar to sleeve 131. A seal in number of seals 112, a corresponding sleeve in number of sleeves 116 to which the seal is attached, and a corresponding structural member in number of structural members 118 to which the corresponding sleeve is attached may be referred to as a seal assembly in these illustrative examples. In this manner, adhesion system 100 may comprise any number of seal assemblies.

When mobile platform 108 moves over surface 104 having a curved shape, the vacuum applied by vacuum system 114 may cause number of seals 112 to adhere to surface 104 and also rotate about pivot point 128 to conform to the curved shape of surface 104. In this manner, the gap formed between each of number of seals 112 and surface 104 may be within selected tolerances.

Further, the capability of each of number of seals 112 to rotate about a corresponding pivot point and each of number of sleeves 116 to float within the channel of a corresponding structural member in number of structural members 118 may allow mobile platform 108 to move along surface 104 having any number of shapes and/or surface inconsistencies. Rotation of number of seals 112 and the movement of number of sleeves 116 may be independent of each other.

The illustration of adhesion system 100 for platform 106 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

With reference now to FIGS. 2-19, illustrations of one implementation for an adhesion system are depicted in accordance with an illustrative embodiment. In FIGS. 2-19, an adhesion system configured for association with a robotic crawler is depicted in accordance with an illustrative embodiment.

Figure 2:
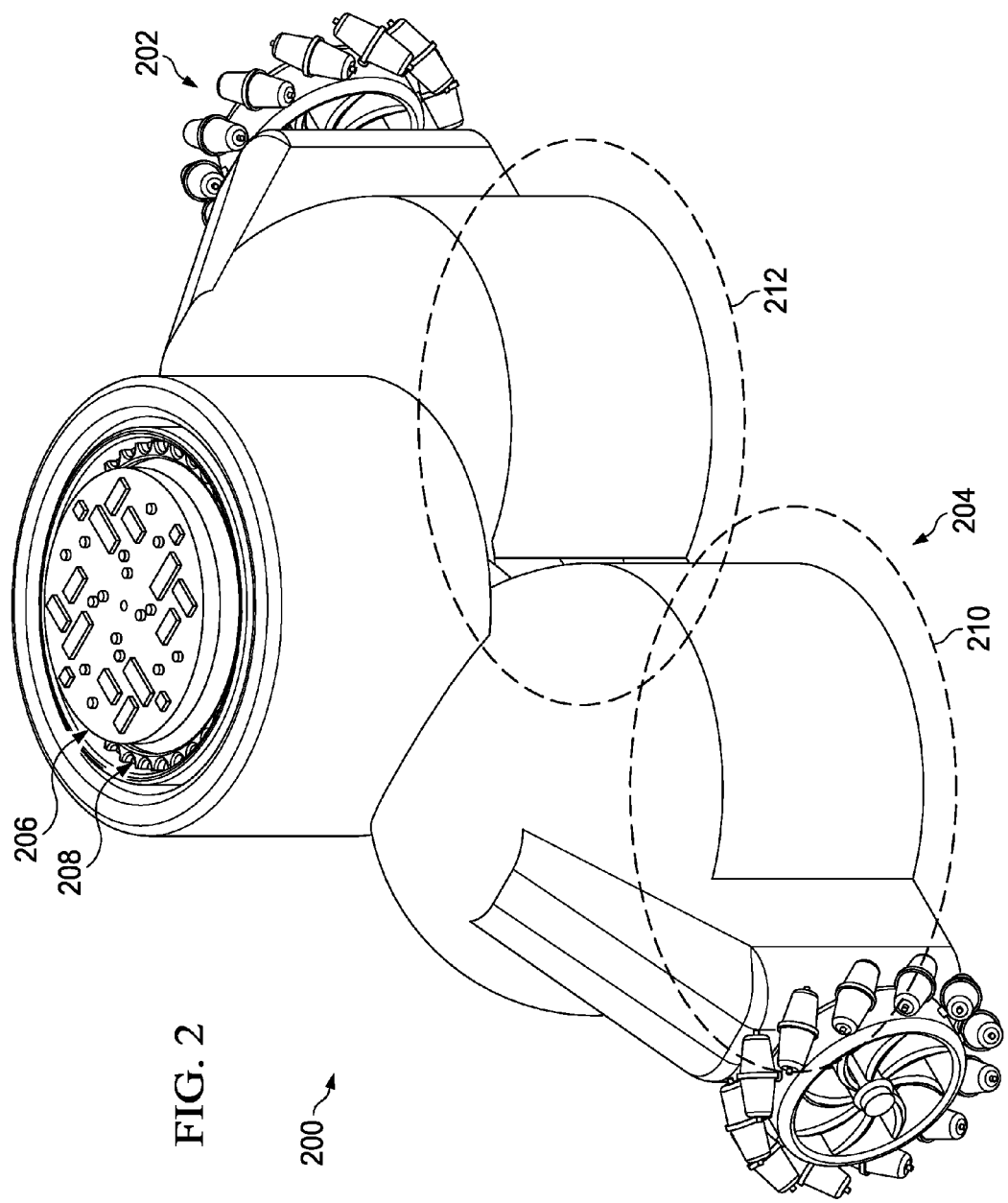
FIG. 2 is an illustration of a robotic crawler and an adhesion system in accordance with an illustrative embodiment.

Turning now to FIG. 2, an illustration of a robotic crawler and an adhesion system is depicted in accordance with an illustrative embodiment. In FIG. 2, robotic crawler 200 is an example of one implementation for mobile platform 108 in FIG. 1. Robotic crawler 200 includes movement system 202, adhesion system 204, and control system 206. In this illustrative example, movement system 202 is configured to allow robotic crawler 200 to move over a surface.

Adhesion system 204 is an example of one implementation for adhesion system 100 in FIG. 1. As depicted, adhesion system 204 includes seal assembly 210 and seal assembly 212. Vacuum system 208 may be an example of one implementation for vacuum system 114 in FIG. 1. Vacuum system 208 is configured to allow a vacuum adhesion to be formed between seal assembly 210 and seal assembly 212. Control system 206 is configured to control movement system 202 and vacuum system 208 in this illustrative example.

Figure 3:
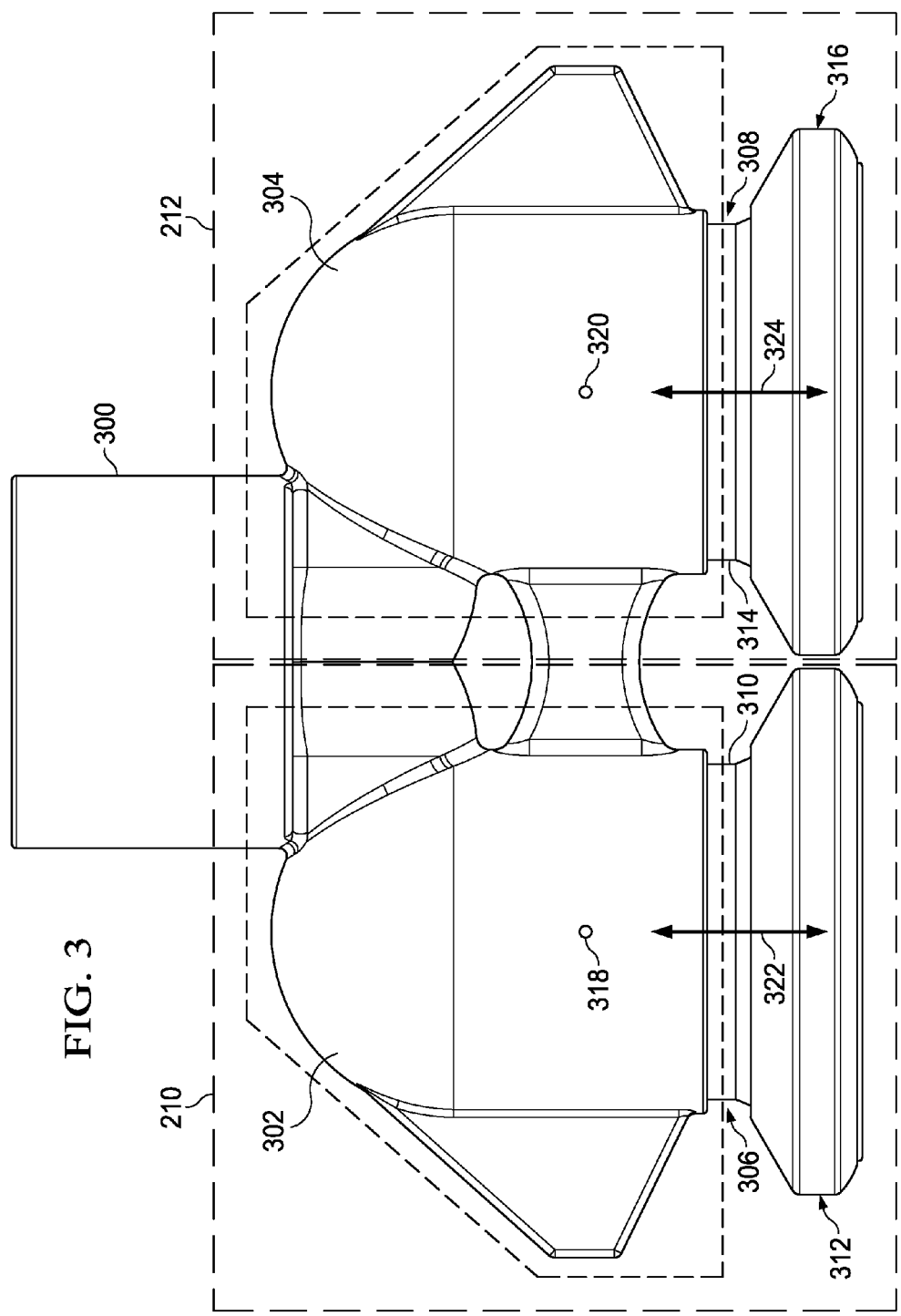
FIG. 3 is an illustration of a side view of an adhesion system in accordance with an illustrative embodiment.

With reference now to FIG. 3, an illustration of a side view of adhesion system 204 from FIG. 2 is depicted in accordance with an illustrative embodiment. As depicted, seal assembly 210 and seal assembly 212 may be connected to each other by structure 300. Structure 300 may be an example of one implementation for structure 110 in FIG. 1.

Structure 300 may comprise structural member 302 and structural member 304. Structural member 302 and structural member 304 may be configured to cover and hold sleeve 306 and sleeve 308, respectively. Sleeve 306 and sleeve 308 are examples of one implementation for number of sleeves 116 in FIG. 1. In this illustrative example, sleeve 306 and sleeve 308 have bearing surface 310 and bearing surface 314, respectively. Seal 312 is attached to bearing surface 310 of sleeve 306, while seal 316 is attached to bearing surface 314 of sleeve 308.

In this illustrative example, pin 318 may be used to hold sleeve 306 within a channel inside structural member 302. Further, pin 320 may be used to hold sleeve 308 within a channel inside structural member 304.

As depicted, structural member 302, sleeve 306, and seal 312 may share center axis 322. Further, structural member 304, sleeve 308, and seal 316 may share center axis 324. Sleeve 306 and sleeve 308 are configured to move in a direction along center axis 322 and center axis 324, respectively, within a selected range of movement. Further, seal 312 and seal 316 are configured to rotate about a pivot point along center axis 322 and a pivot point around center axis 324, respectively, within a selected range of rotation.

Figure 4:
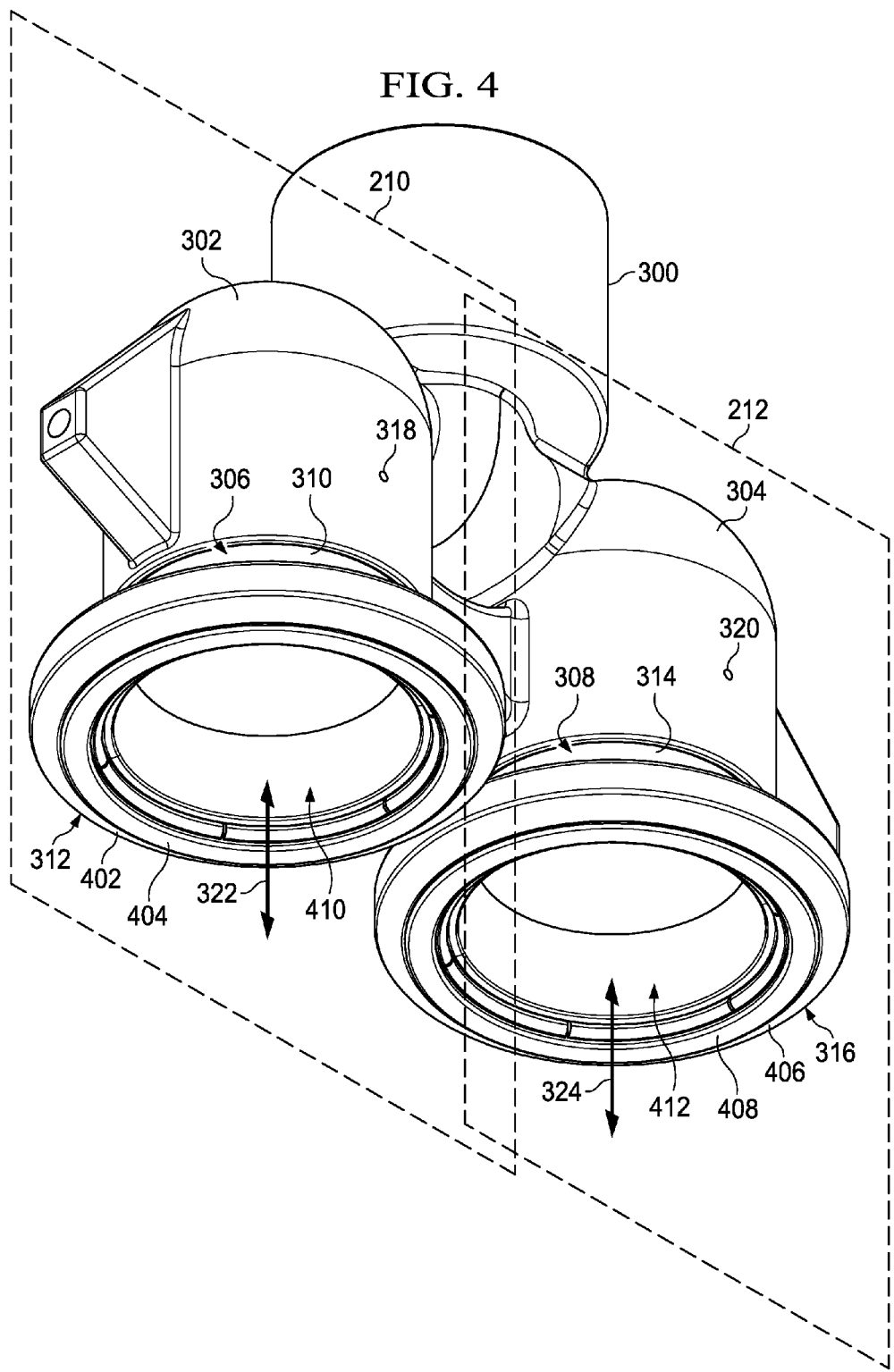
FIG. 4 is an illustration of a bottom isometric side view of an adhesion system in accordance with an illustrative embodiment.

With reference now to FIG. 4, an illustration of a bottom isometric side view of adhesion system 204 from FIG. 2 is depicted in accordance with an illustrative embodiment. As depicted, seal 312 comprises seal component 402 and seal component 404 nested within seal component 402. Further, seal 316 comprises seal component 406 and seal component 408.

Seal component 402, seal component 404, seal component 406, and seal component 408 may be comprised of a number of different materials. For example, these seal components may be comprised of rubber, a viscoelastomeric material, an elastomer, a flexible material, and/or other types of materials.

In this illustrative example, channel 410 extends through seal 312, sleeve 306, and structural member 302. Further, channel 412 extends through seal 316, sleeve 308, and structural member 304. Channel 410 and channel 412 are examples of one implementation for the channel formed by channel 122 of structural member 120, sleeve 131, and seal 125 in FIG. 1. Vacuum system 208 from FIG. 2 may be used to draw air into channel 410 and channel 412 from the environment around adhesion system 204 in FIG. 2 such that a vacuum adhesion is formed between seal 312 and a surface and between seal 316 and the same surface.

Figure 5:
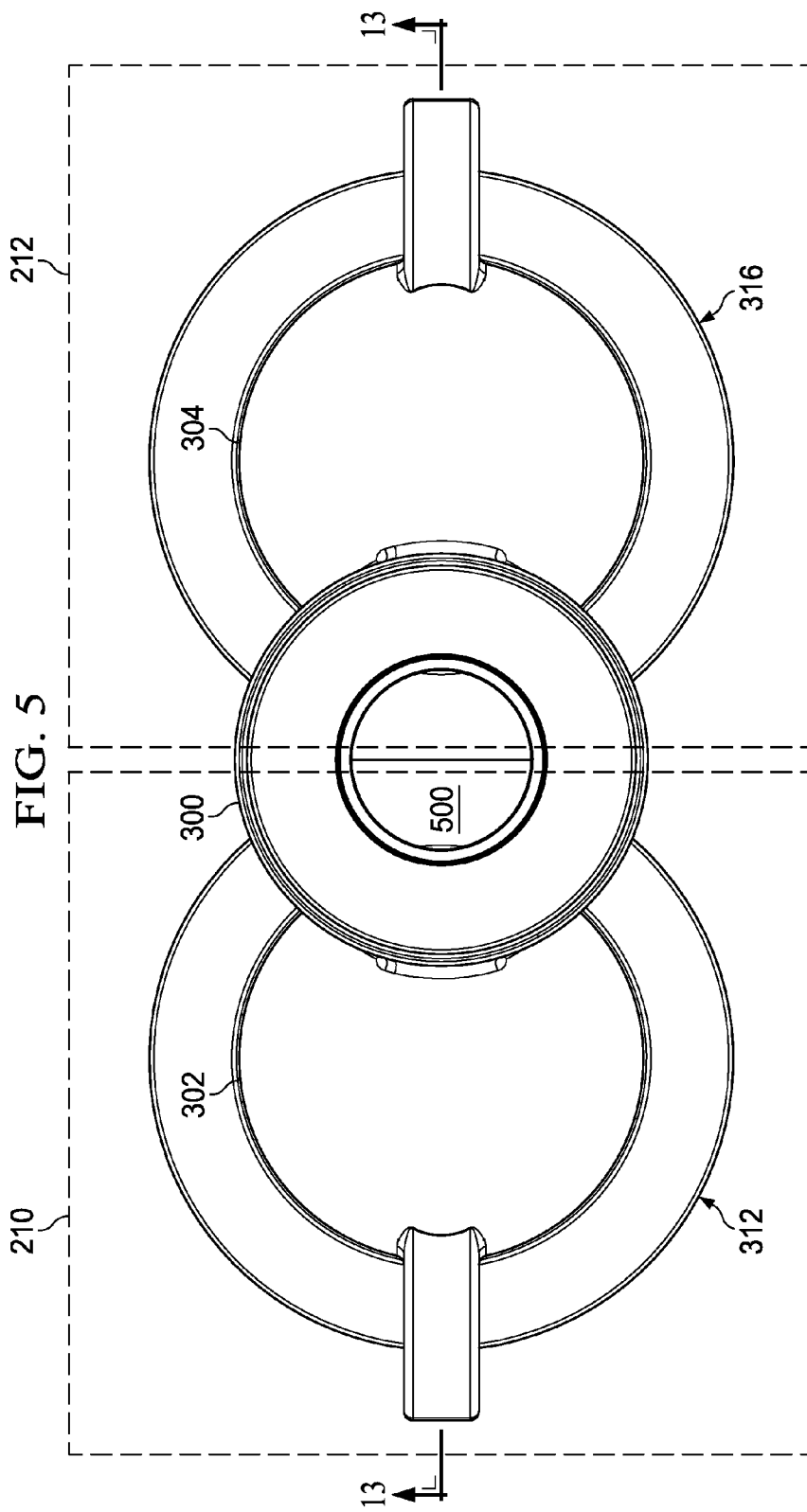
FIG. 5 is an illustration of a top view of an adhesion system in accordance with an illustrative embodiment.

With reference now to FIG. 5, an illustration of a top view of adhesion system 204 from FIG. 3 is depicted in accordance with an illustrative embodiment. In this top view of adhesion system 204, duct 500 within structure 300 is seen. Duct 500 is a vacuum duct in this illustrative example. Duct 500 is connected to channel 410 and channel 412 from FIG. 4. In this manner, vacuum system 208 from FIG. 2 may draw air from channel 410 and channel 412 into duct 500.

Figure 6:
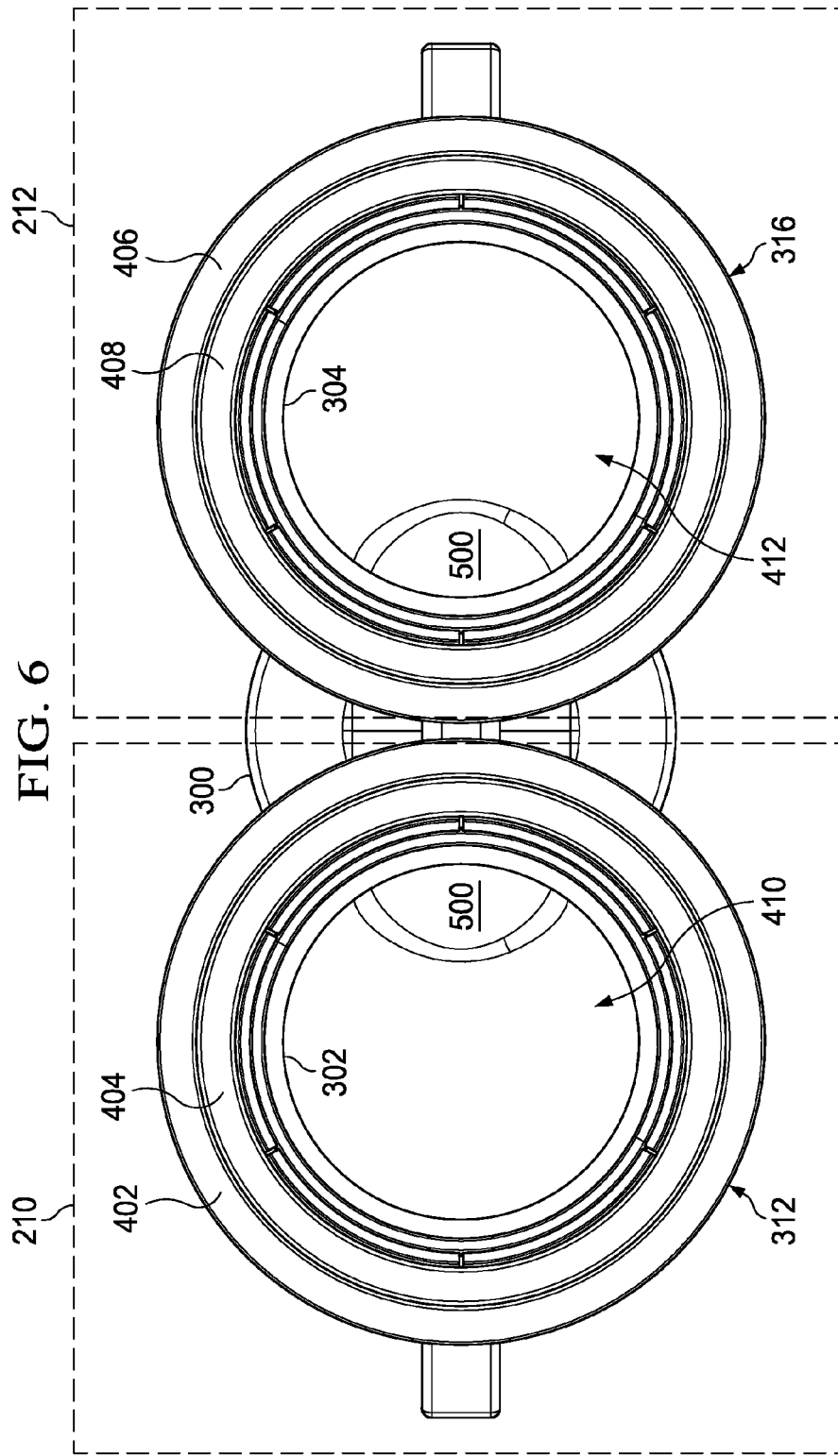
FIG. 6 is an illustration of a bottom view of an adhesion system in accordance with an illustrative embodiment.

Turning now to FIG. 6, an illustration of a bottom view of adhesion system 204 from FIG. 3 is depicted in accordance with an illustrative embodiment. In this illustrative example, the connection between channel 410 and channel 412 to duct 500 is depicted.

Figure 7:
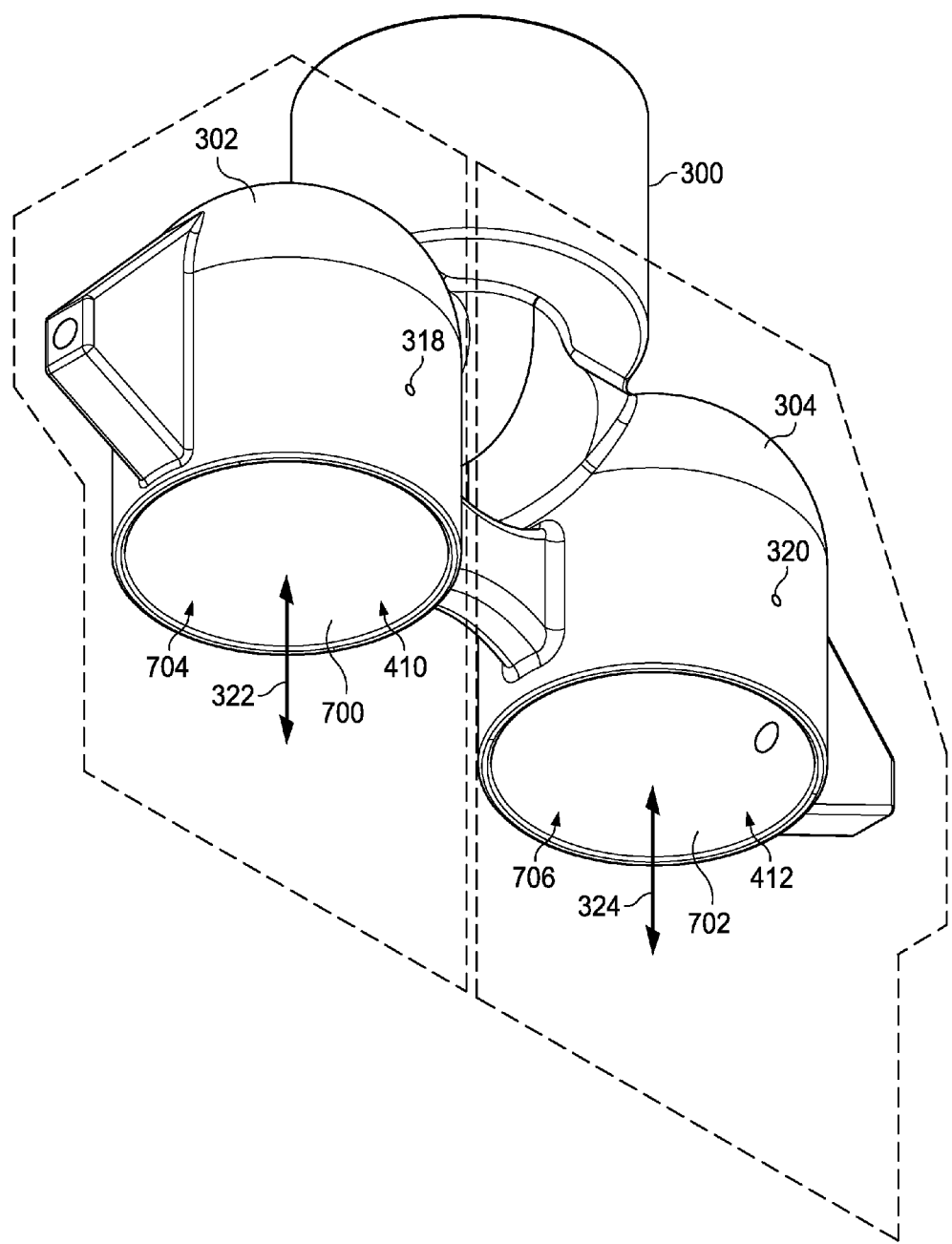
FIG. 7 is an illustration of a bottom isometric view of a structure in accordance with an illustrative embodiment.

With reference now to FIG. 7, an illustration of a bottom isometric view of structure 300 from FIG. 3 is depicted in accordance with an illustrative embodiment. In this illustrative example, inner surface 700 of structural member 302 and inner surface 702 of structural member 304 are depicted.

Inner surface 700 of structural member 302 forms channel 704 within structural member 302. Inner surface 702 of structural member 304 forms channel 706 within structural member 304. Channel 704 and channel 706 form a portion of channel 410 and channel 412, respectively. Pin 318 and pin 320 may extend past inner surface 700 and inner surface 702, respectively, into channel 704 and channel 706, respectively.

Figure 8:
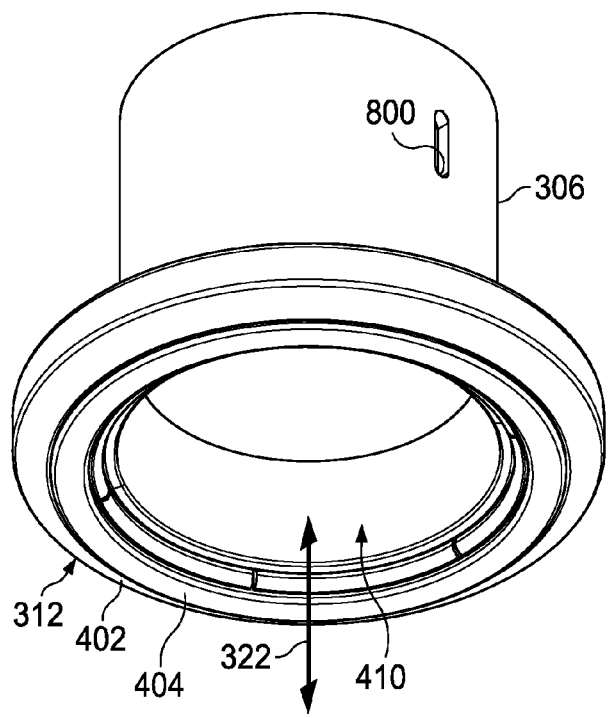
FIG. 8 is an illustration of a bottom perspective view of a sleeve and a seal attached to the sleeve in accordance with an illustrative embodiment.

With reference now to FIG. 8, an illustration of a bottom perspective view of sleeve 306 and seal 312 attached to sleeve 306 from FIG. 3 is depicted in accordance with an illustrative embodiment. As depicted, sleeve 306 has opening 800. Opening 800 is configured to receive pin 318 in FIG. 3.

Sleeve 306 may be held within structural member 302 in FIG. 3 when pin 318 is received within opening 800. Sleeve 306 may be configured to move in a direction along center axis 322 relative to structural member 302 from FIG. 3. However, the range of movement of sleeve 306 may be limited by the length of opening 800 with respect to center axis 322.

Figure 9:
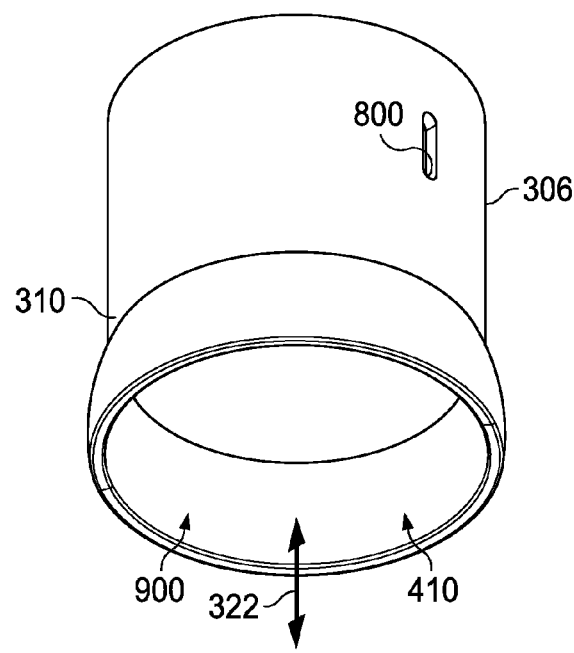
FIG. 9 is an illustration of a sleeve without a seal attached to the sleeve in accordance with an illustrative embodiment.

With reference now to FIG. 9, an illustration of sleeve 306 from FIG. 8 without seal 312 attached to sleeve 306 is depicted in accordance with an illustrative embodiment. Sleeve 306 has sleeve channel 900. Sleeve channel 900 forms a portion of channel 410. Sleeve channel 900 is an example of one implementation for sleeve channel 132 in FIG. 1.

As depicted, bearing surface 310 has a curved shape. In this illustrative example, the curved shape of bearing surface 310 may substantially match a portion of a spherical shape. Bearing surface 310 is configured to control how much seal 312 in FIG. 3 can rotate relative to sleeve 306.

Figure 10:
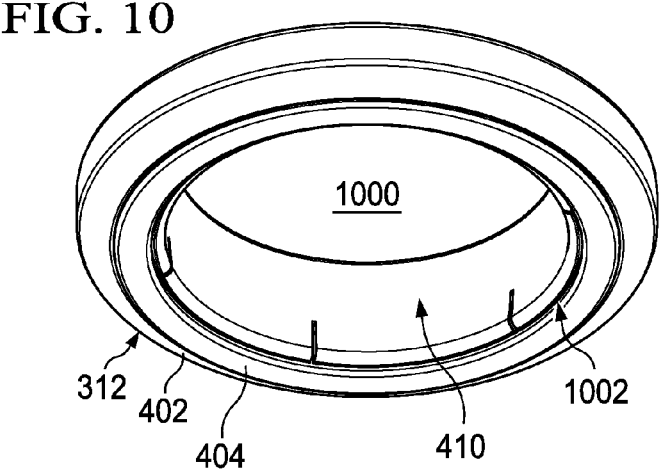
FIG. 10 is an illustration of a seal without a sleeve in accordance with an illustrative embodiment.

Turning now to FIG. 10, an illustration of seal 312 from FIG. 8 without sleeve 306 is depicted in accordance with an illustrative embodiment. As depicted, seal 312 has seal channel 1000. Seal channel 1000 forms a portion of channel 410. Seal channel 1000 is an example of one implementation for seal channel 126 in FIG. 1. Further, in this illustrative example, seal component 404 is more clearly seen nested within groove 1002 of seal component 402.

Figure 11:
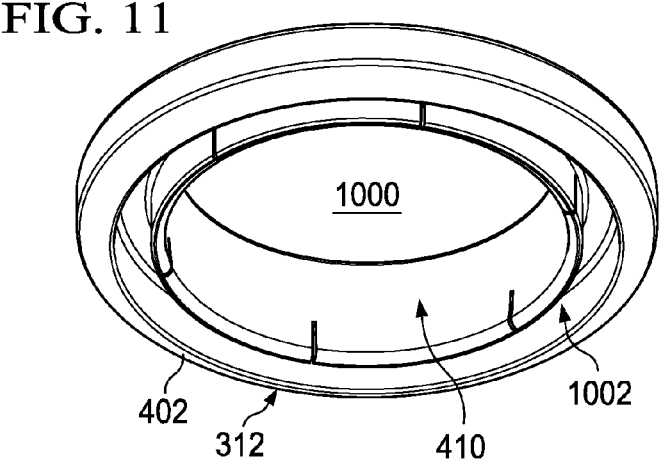
FIG. 11 is an illustration of a seal component of a seal in accordance with an illustrative embodiment.
Figure 12:
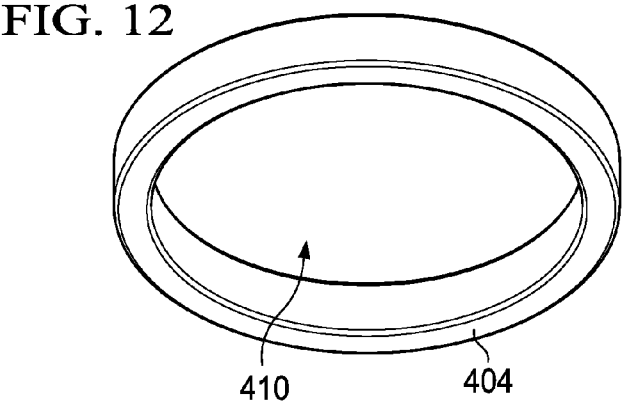
FIG. 12 is an illustration of a seal component of a seal in accordance with an illustrative embodiment.

With reference now to FIG. 11, an illustration of seal component 402 of seal 312 from FIG. 10 is depicted in accordance with an illustrative embodiment. In FIG. 12, an illustration of seal component 404 of seal 312 from FIG. 10 is depicted in accordance with an illustrative embodiment.

Figure 13:
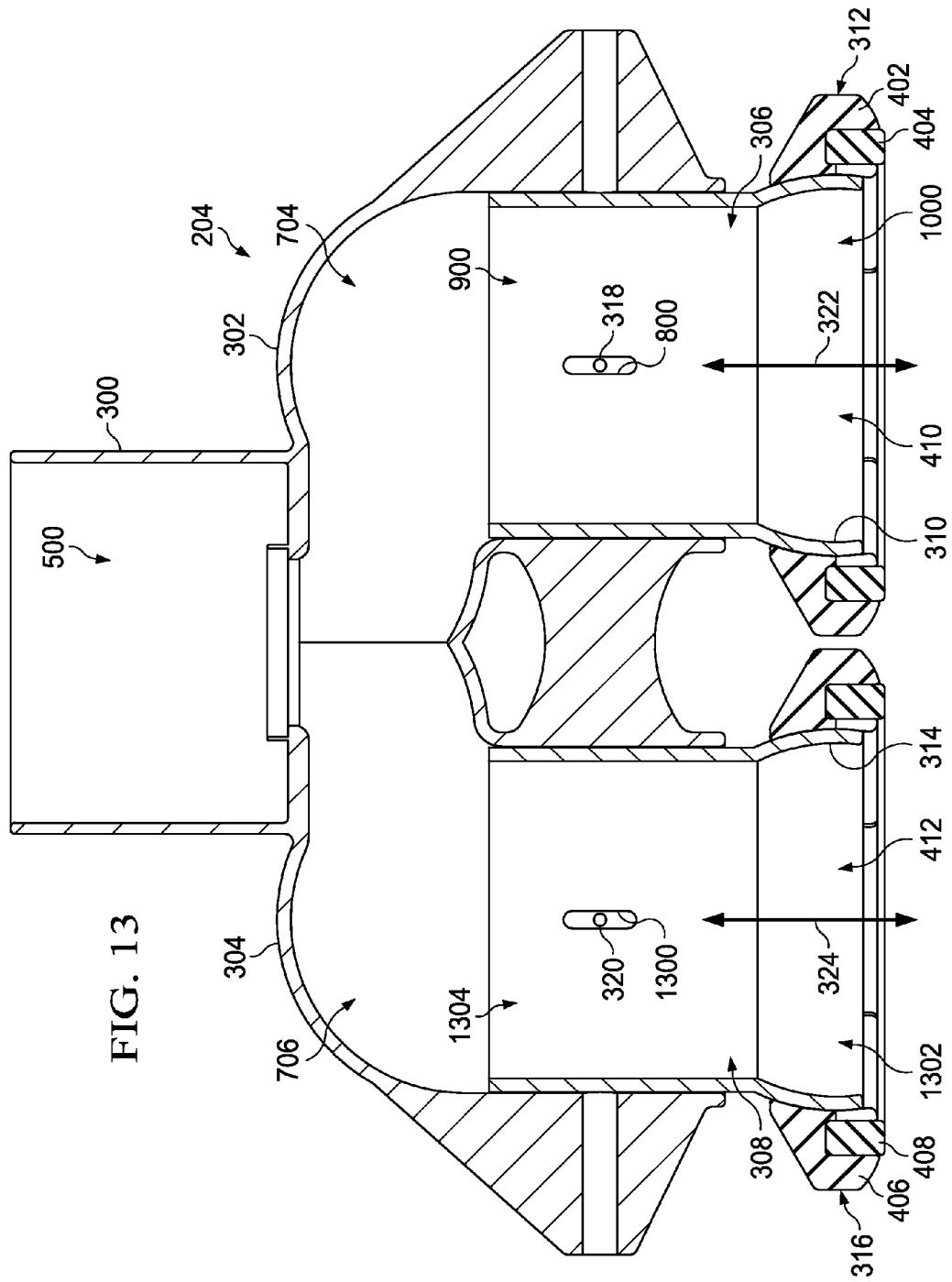
FIG. 13 is an illustration of a cross-sectional side view of an adhesion system in accordance with an illustrative embodiment.

With reference now to FIG. 13, an illustration of a cross-sectional side view of adhesion system 204 from FIG. 4 is depicted in accordance with an illustrative embodiment. In this illustrative example, a cross-sectional view of adhesion system 204 is depicted taken along lines 13-13 in FIG. 5.

The side view of adhesion system 204 in FIG. 13 is from a side of adhesion system 204 opposite to the side of adhesion system 204 seen in FIGS. 3-4. In FIG. 13, pin 318 is seen within opening 800 of sleeve 306. Further, pin 320 is seen within opening 1300 of sleeve 308.

Pin 318 and pin 320 are located within the middle of opening 800 and opening 1300, respectively. When pin 318 is located within the middle of opening 800, sleeve 306 is considered in an initial position relative to structural member 302. Further, when pin 320 is located in the middle of opening 1300, sleeve 308 is considered in an initial position relative to structural member 304.

In FIG. 13, seal channel 1000 through seal 312 is aligned with sleeve channel 900 of sleeve 306. In other words, a center axis through seal channel 1000 is aligned with center axis 322 through sleeve 306 such that these two center axes are parallel. When the center axis of seal 312 is aligned with center axis 322, seal 312 is in an initial position and is not considered rotated relative to sleeve 306.

Similarly, in FIG. 13, seal channel 1302 through seal 316 is aligned with sleeve channel 1304 of sleeve 308. In other words, a center axis through seal channel 1302 is aligned with center axis 324 through sleeve 308 such that these two center axes are parallel. When the center axis of seal 316 is aligned with center axis 324, seal 316 is in an initial position and is not considered rotated relative to sleeve 308.

Figure 14:
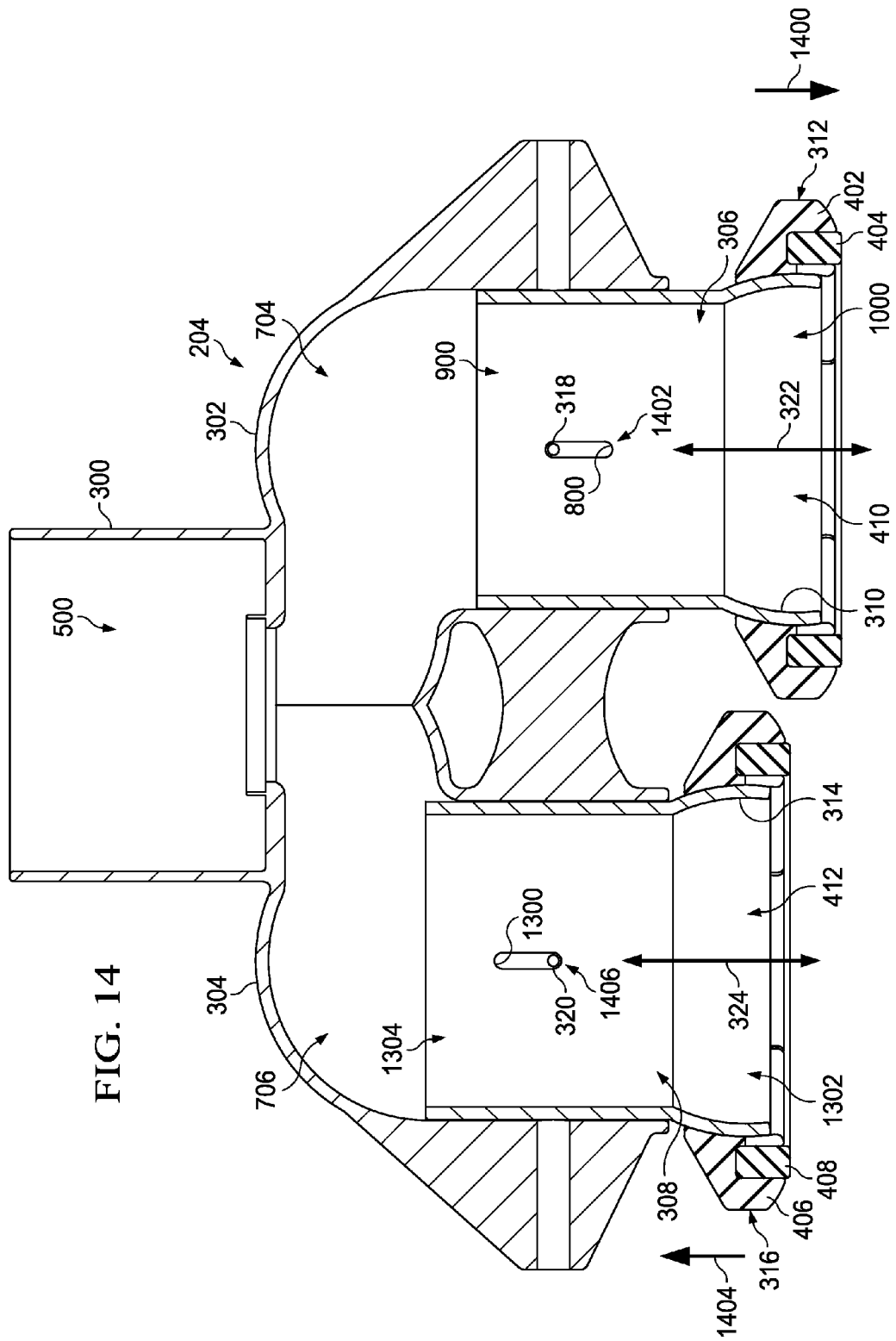
FIG. 14 is an illustration of a cross-sectional side view of an adhesion system in accordance with an illustrative embodiment.

Turning now to FIG. 14, an illustration of a cross-sectional side view of adhesion system 204 from FIG. 4 is depicted in accordance with an illustrative embodiment. In FIG. 14, sleeve 306 has moved away from an initial position in the direction of arrow 1400 along center axis 322 relative to structural member 302 such that pin 318 is positioned at top 1402 of opening 800. Further, sleeve 308 has moved away from an initial position in the direction of arrow 1404 along center axis 324 relative to structural member 304 such that pin 320 is positioned at bottom 1406 of opening 1300.

The length of opening 800 restricts the movement of sleeve 306 such that sleeve 306 may be unable to move any further in the direction of arrow 1400. Further, the length of opening 1300 restricts the movement of sleeve 308 such that sleeve 308 may be unable to move any further in the direction of arrow 1404.

Turning now to FIGS. 15-19, illustrations of adhesion system 204 adhering to different types of surfaces are depicted in accordance with an illustrative embodiment. In particular, in FIGS. 15-19, adhesion system 204 is depicted adhering to surfaces having different curved shapes and/or different inconsistencies.

In each of FIGS. 15-19, seal 312 and/or seal 316 may be rotated relative to sleeve 306 and sleeve 308, respectively, to conform to the different surfaces. Further, sleeve 306 and/or sleeve 308 may have different positions relative to structural member 302 and structural member 304, respectively, to allow seal 312 and seal 316, respectively, to better conform to the different surfaces.

Figure 15:
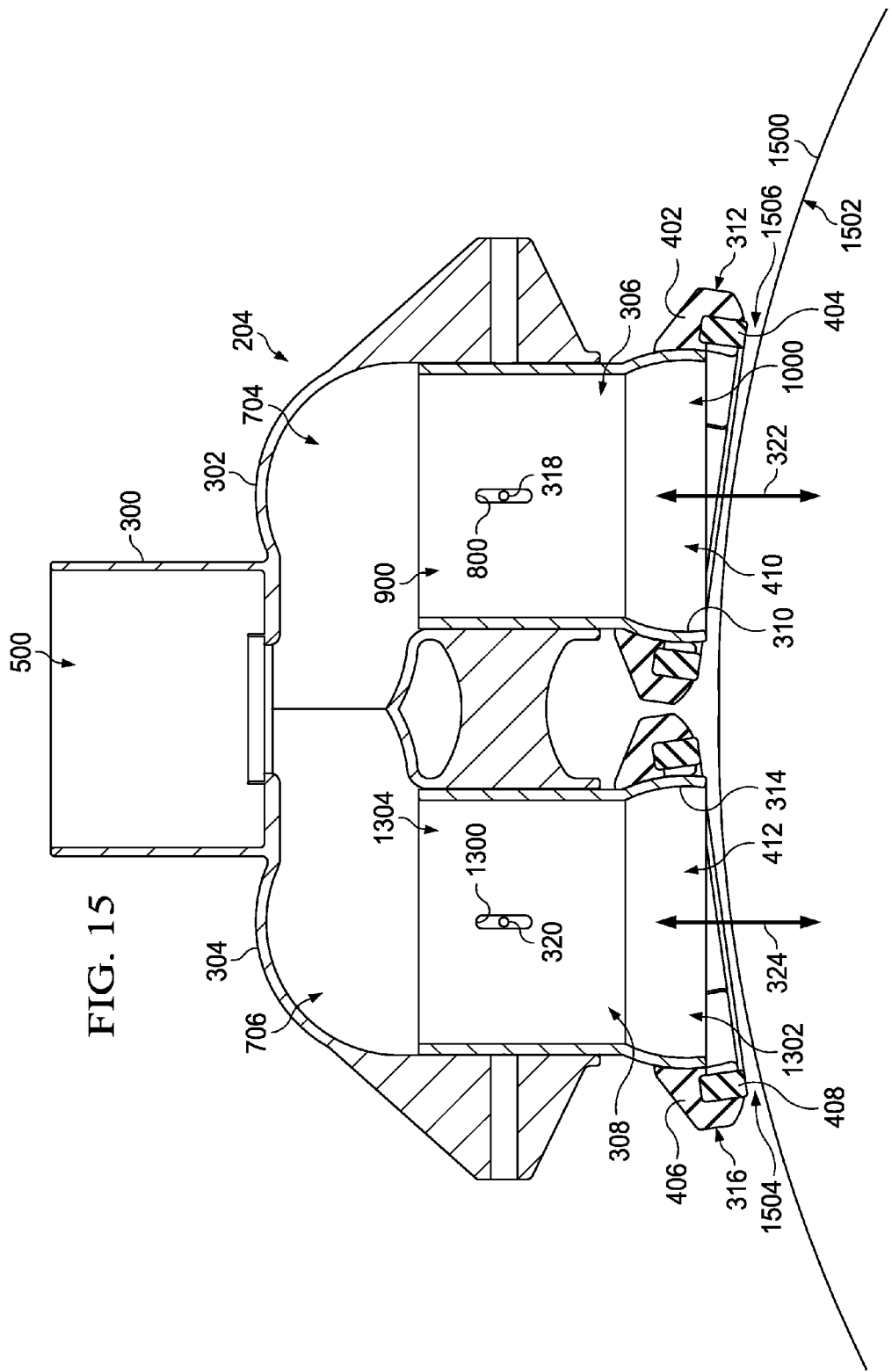
FIG. 15 is an illustration of an adhesion system adhering to a surface in accordance with an illustrative embodiment.

With reference now to FIG. 15, an illustration of adhesion system 204 adhering to a surface is depicted in accordance with an illustrative embodiment. In this illustrative example, adhesion system 204 adheres to surface 1500 using vacuum adhesion. Surface 1500 has curved shape 1502. Curved shape 1502 is a convex shape in this depicted example.

Sleeve 306 and sleeve 308 are in initial positions in FIG. 15. However, seal 312 has rotated relative to sleeve 306 and seal 316 has rotated relative to sleeve 308 such that seal 312 and seal 316 conform to curved shape 1502. In this manner, gap 1504 formed between seal 312 and surface 1500 and gap 1506 formed between seal 316 and surface 1500 may be within selected tolerances for maintaining the vacuum adhesion between adhesion system 204 and surface 1500.

Figure 16:
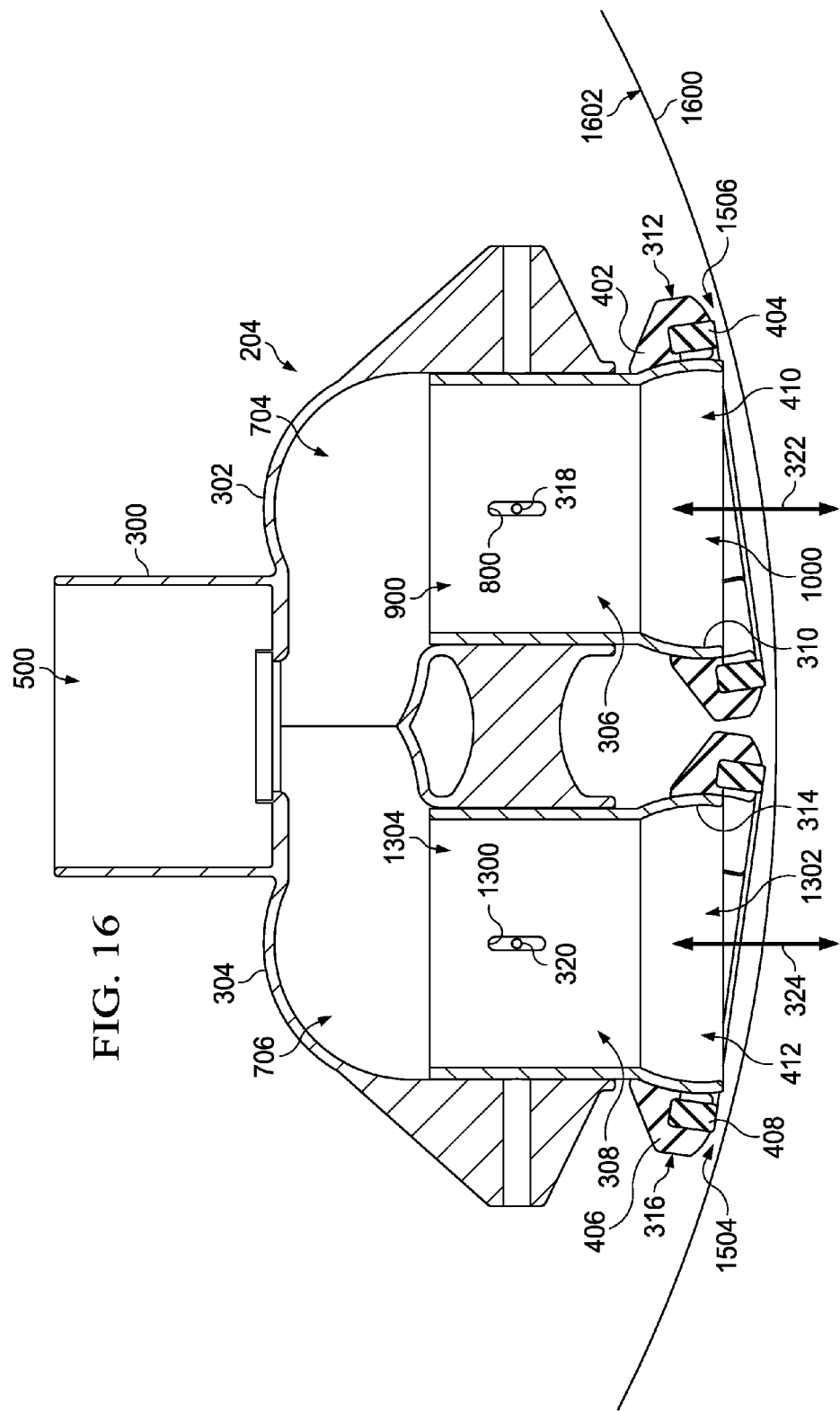
FIG. 16 is an illustration of an adhesion system adhering to a surface in accordance with an illustrative embodiment.

With reference now to FIG. 16, an illustration of adhesion system 204 adhering to a surface is depicted in accordance with an illustrative embodiment. In this illustrative example, adhesion system 204 adheres to surface 1600 using vacuum adhesion. Surface 1600 has curved shape 1602. Curved shape 1602 is a concave shape in this depicted example.

Sleeve 306 and sleeve 308 are in initial positions in FIG. 16. However, seal 312 has rotated relative to sleeve 306 and seal 316 has rotated relative to sleeve 308 such that seal 312 and seal 316 conform to curved shape 1602.

Figure 17:
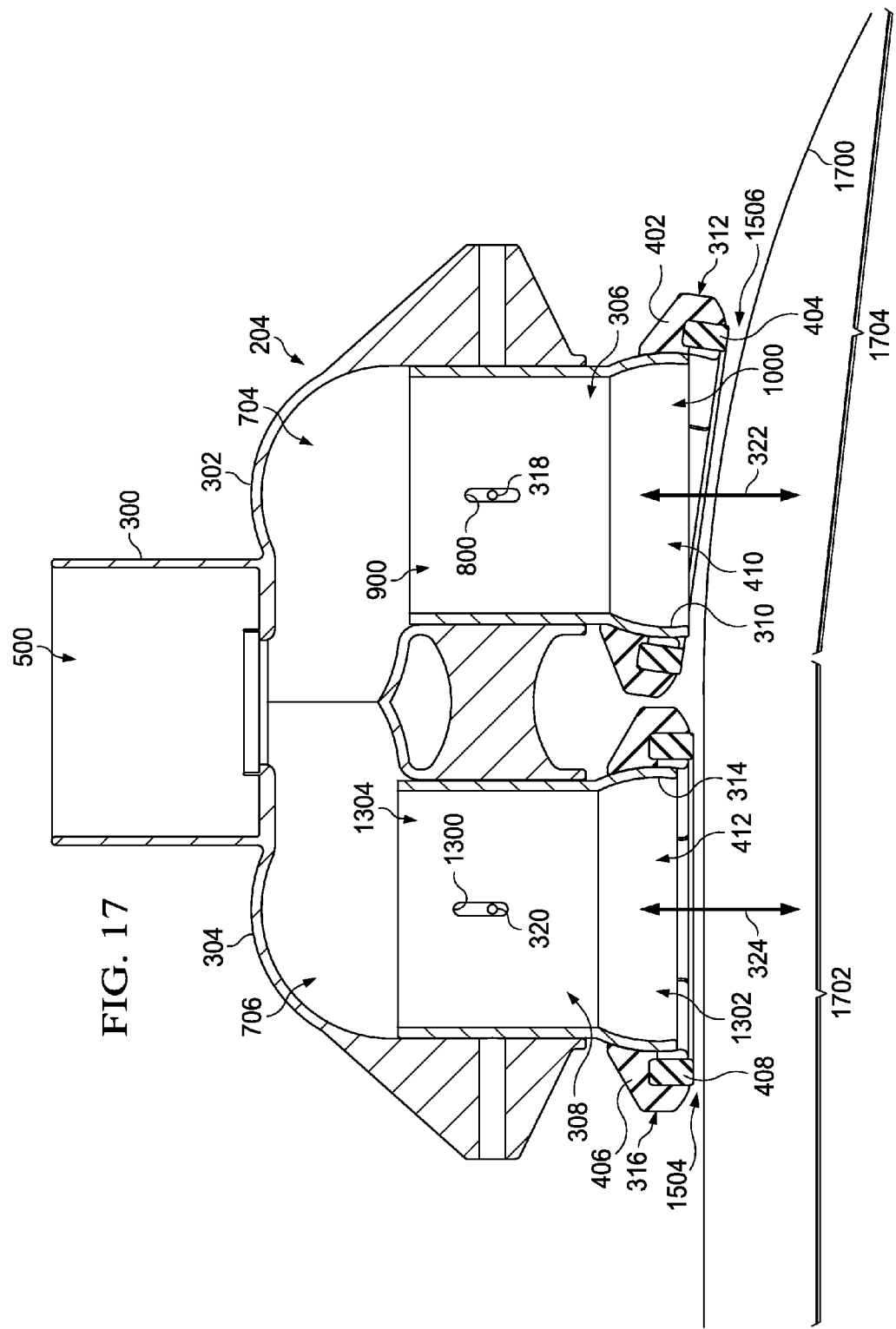
FIG. 17 is an illustration of an adhesion system adhering to a surface in accordance with an illustrative embodiment.

With reference now to FIG. 17, an illustration of adhesion system 204 adhering to a surface is depicted in accordance with an illustrative embodiment. In this illustrative example, adhesion system 204 adheres to surface 1700 using vacuum adhesion. Portion 1702 of surface 1700 is substantially flat. However, portion 1704 of surface 1700 is curved.

Sleeve 308 has moved from an initial position. However, seal 316 is not rotated relative to sleeve 308. Sleeve 306 remains in an initial position but seal 312 has rotated relative to sleeve 306.

Figure 18:
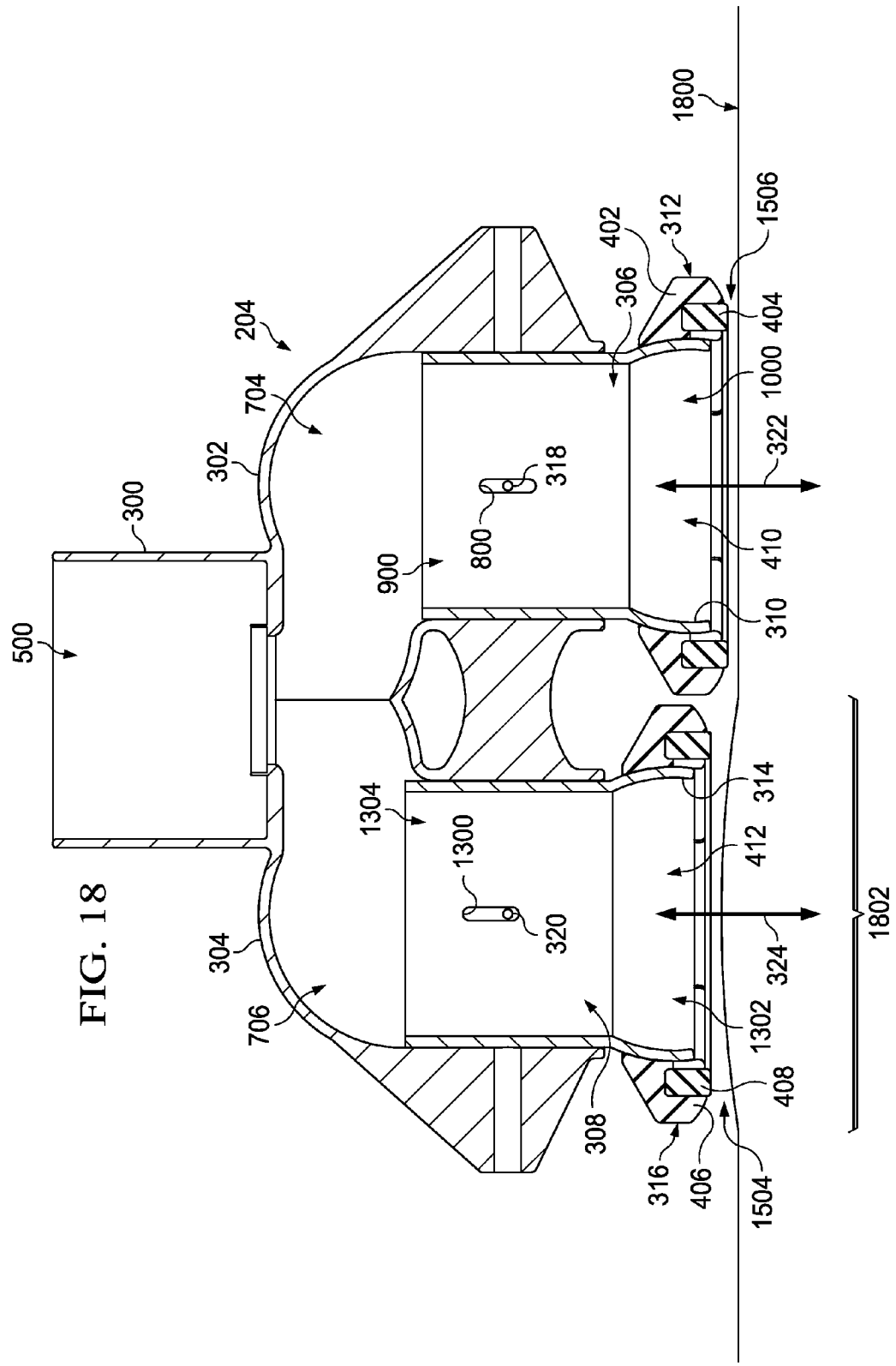
FIG. 18 is an illustration of an adhesion system adhering to a surface in accordance with an illustrative embodiment.

With reference now to FIG. 18, an illustration of adhesion system 204 adhering to a surface is depicted in accordance with an illustrative embodiment. In this illustrative example, adhesion system 204 adheres to surface 1800 using vacuum adhesion. Surface 1800 is substantially flat except for portion 1802. Portion 1802 has a convex shape in this illustrative example.

As depicted, seal 312 has not rotated relative to sleeve 306 and seal 316 has not rotated relative to sleeve 308. Sleeve 308 has moved from an initial position, while sleeve 306 remains in an initial position.

Figure 19:
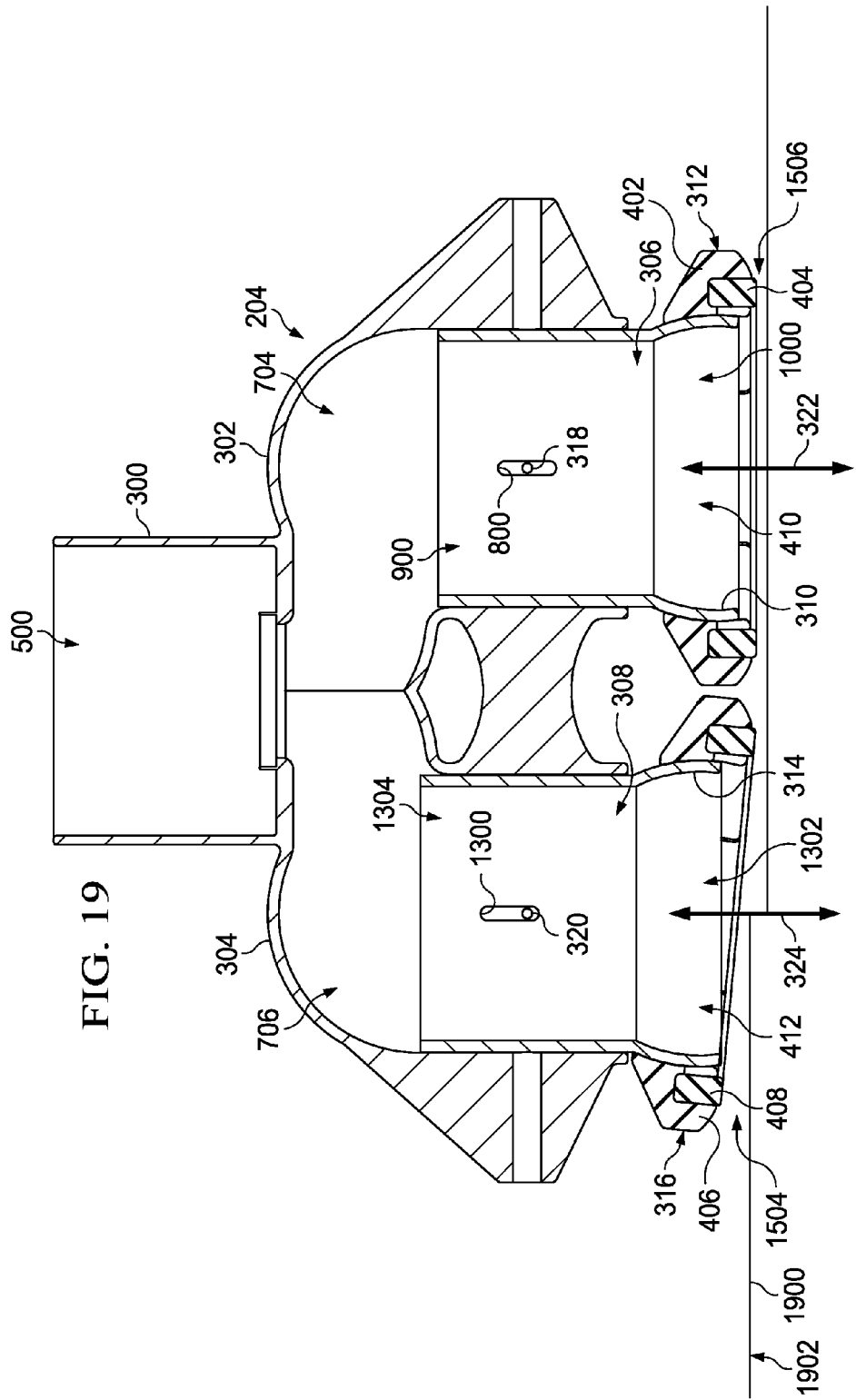
FIG. 19 is an illustration of an adhesion system adhering to a surface in accordance with an illustrative embodiment.

With reference now to FIG. 19, an illustration of adhesion system 204 adhering to a surface is depicted in accordance with an illustrative embodiment. In this illustrative example, adhesion system 204 adheres to surface 1900 using vacuum adhesion. Surface 1900 has step 1902 along surface 1900. Step 1902 is an example of one type of inconsistency that may be present on a surface.

Seal 316 has rotated relative to sleeve 307 and sleeve 308 has moved away from an initial position. Seal 312 has not rotated relative to sleeve 306 and sleeve 306 remains in an initial position.

The illustrations of adhesion system 204 in FIGS. 2-6, the different components of adhesion system 204 in FIGS. 7-12, the cross-sectional views of adhesion system 204 in FIGS. 13-14, and the adhesion of adhesion system 204 to different surfaces in FIG. 15-19 are not meant to imply physical or architectural limitations to the manner in which an illustrative embodiment may be implemented. Other components in addition to or in place of the ones illustrated may be used. Some components may be optional.

The different components in FIGS. 2-19 may be illustrative examples of how components shown in block form in FIG. 1 can be implemented as physical structures. The different components shown in FIGS. 2-19 may be combined with components in FIG. 1, used with components in FIG. 1, or a combination of the two.

Figure 20:
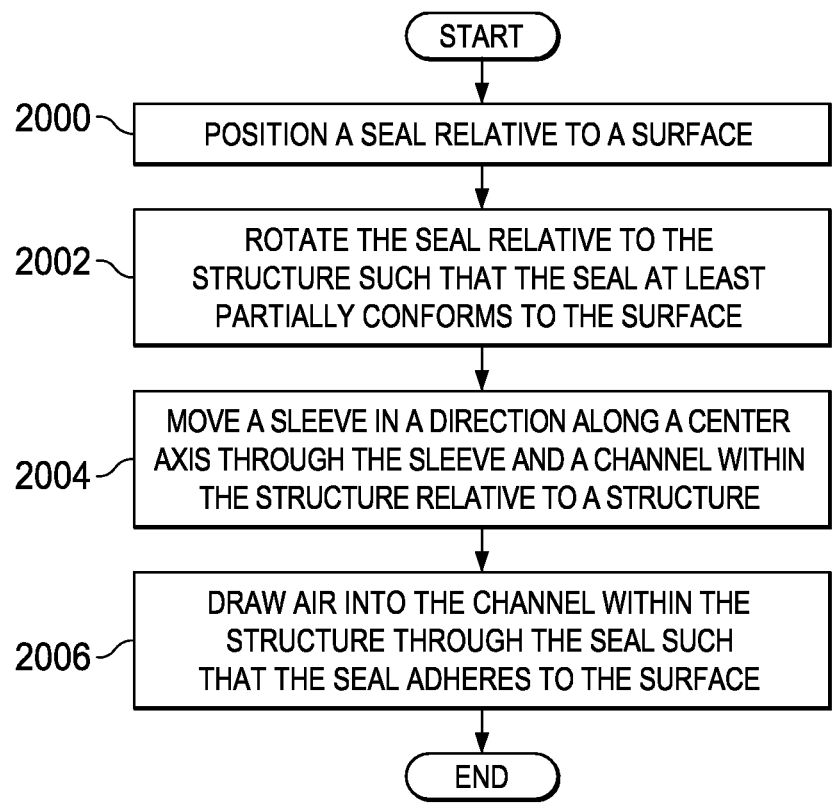
FIG. 20 is an illustration of a process for adhering to a surface in the form of a flowchart in accordance with an illustrative embodiment.

With reference now to FIG. 20, an illustration of a process for adhering to a surface in the form of a flowchart is depicted in accordance with an illustrative embodiment. The process illustrated in FIG. 20 may be implemented using adhesion system 100 in FIG. 1.

The process begins by positioning a seal in an adhesion system relative to a surface (operation 2000). The seal is associated with a structure in the adhesion system. Further, the seal is in communication with a channel within the structure. In particular, the seal is associated with a bearing surface at an end of a sleeve. The sleeve is positioned in the channel within the structure.

The seal is rotated relative to the structure such that the seal at least partially conforms to the surface (operation 2002). Further, the sleeve is moved in a direction along a center axis through the sleeve and the channel within the structure relative to the structure (operation 2004). In some illustrative examples, operation 2002 and operation 2004 are performed at the same time.

Thereafter, air is drawn into the channel within the structure through the seal such that the seal adheres to the surface (operation 2006), with the process terminating thereafter. Operation 2006 may be performed using, for example, a vacuum system.

In operation 2006, the air is drawn into the channel within the structure through a seal channel within the seal and a sleeve channel within the sleeve. Further, in operation 2006, a vacuum adhesion is formed between the seal and the surface in which a gap is present between the seal and the surface. The gap has a width within selected tolerances.

Operations 2002, 2004, and 2006 may be performed during movement of a mobile platform with which the adhesion system is associated over the surface. Rotation of the seal and movement of the sleeve allow the adhesion system to adapt to changes in the shape of the surface as the mobile platform moves along the surface. The mobile platform may be, for example, a robotic crawler.

The flowchart and block diagram in the different depicted embodiments illustrate the architecture, functionality, and operation of some possible implementations of apparatus and methods in an illustrative embodiment. In this regard, each block in the flowcharts or block diagrams may represent a module, a segment, a function, and/or a portion of an operation or step.

In some alternative implementations of an illustrative embodiment, the function or functions noted in the blocks may occur out of the order noted in the figures. For example, in some cases, two blocks shown in succession may be executed substantially concurrently, or the blocks may sometimes be performed in the reverse order, depending upon the functionality involved. Also, other blocks may be added in addition to the illustrated blocks in a flowchart or block diagram.

Thus, the different illustrative embodiments provide a method and apparatus for forming a vacuum adhesion. In one illustrative embodiment, a seal is positioned relative to a surface. The seal is associated with a structure comprising a channel through which air is configured to flow. The seal is rotated relative to the structure such that the seal at least partially conforms to the surface. Air is drawn into the channel within the structure through the seal such that the seal adheres to the surface.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other illustrative embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for adhering to a first surface, the method comprising:
    positioning a seal relative to the first surface, wherein the seal is associated with a structure and is in communication with a first channel within the structure;
    rotating the seal relative to the structure such that the seal at least partially conforms to the first surface, wherein the first surface is non-planar;
    drawing air into the first channel within the structure through the seal such that the seal adheres to the first surface; and
    moving a sleeve in a direction along a center axis through the sleeve and the first channel within the structure relative to the structure, the sleeve having a first end and a second end, wherein the sleeve is positioned in the first channel within the structure and the seal is associated with a bearing surface at the first end of the sleeve.

2. The method of claim 1, wherein rotating the seal relative to the structure comprises:
    rotating the seal relative to the sleeve such that the seal at least partially conforms to the first surface, wherein rotation of the seal relative to the sleeve is limited by the bearing surface at the first end of the sleeve.

3. The method of claim 1, wherein drawing the air into the first channel within the structure through the seal comprises:
    drawing the air into the first channel within a first structural member in the structure through a seal channel within the seal and a sleeve channel within the sleeve such that the seal adheres to the first surface using a vacuum system.

4. The method of claim 1, further comprising:
    wherein the structure, the sleeve, and the seal are part of an adhesion system associated with a platform; and
    wherein rotating the seal relative to the structure such that the seal at least partially conforms to the surface and moving the sleeve in the direction along the center axis through the sleeve and the first channel within the structure relative to the structure are performed during movement of the platform over the first surface.

5. The method of claim 4, wherein the platform is one of mobile or stationary.

6. The method of claim 4, wherein the platform is a mobile platform, the mobile platform selected from the group consisting of a mobile robotic machine, a robotic crawler, a mobile inspection system, and an unmanned ground vehicle.

7. The method of claim 4, wherein the platform is a stationary platform, the stationary platform selected from the group consisting of a stage, an inspection system, a manmade structure, a container, and a retaining structure.

8. The method of claim 1, wherein the first surface being non-planar is defined as being one of the group consisting of not flat, having a curved shape, having at least one hill, having at least one valley, having at least one curved feature, having inconsistencies along the first surface, having at least one protrusion at a number of locations on the first surface, and having at least one fastener joint extending out of a plane through the first surface.

9. The method of claim 1, wherein the first surface belongs to an object associated with one of the group consisting of a fuselage of an aircraft, a wing of an aircraft, a nacelle of an engine, an aerospace vehicle, a hull of a ship, a missile, a cargo container, a door, a wall, a roof, a window, a structure, a table, and a floor.

10. The method of claim 1, wherein the seal comprises a seal component, the seal component selected from the group consisting of rubber, a viscoelastomeric material, an elastomer, and a flexible material.

\* \* \* \* \*